Feb. 7, 1956 T. C. G. WAGNER 2,734,135

FREQUENCY MODULATED OSCILLATOR FOR HIGH CARRIER FREQUENCIES

Filed Oct. 15, 1953

INVENTOR

THOMAS C. G. WAGNER

BY Scrivener & Parker

ATTORNEYS

United States Patent Office 2,734,135
Patented Feb. 7, 1956

2,734,135

FREQUENCY MODULATED OSCILLATOR FOR HIGH CARRIER FREQUENCIES

Thomas C. G. Wagner, Brookdale, Md., assignor to The Davies Laboratories, Incorporated, Riverdale, Md., a corporation of Maryland Application October 15, 1953, Serial No. 386,183

4 Claims. (Cl. 250—36)

This invention relates to frequency modulation and more particularly to a frequency modulated oscillator circuit for the production of modulated signals for high carrier frequencies.

A principal object of this invention is to provide a novel circuit for the production of modulated signals for high carrier frequencies which has a higher degree of linearity and stability than circuits used heretofore.

Another object of the invention is to provide an oscillator circuit of the above type which eliminates the use of multivibrators and similar circuits having generally nonlinear and unstable characteristics and is adapted for use with carrier frequencies of between approximately 50 and 500 kcs.

Figure 2:
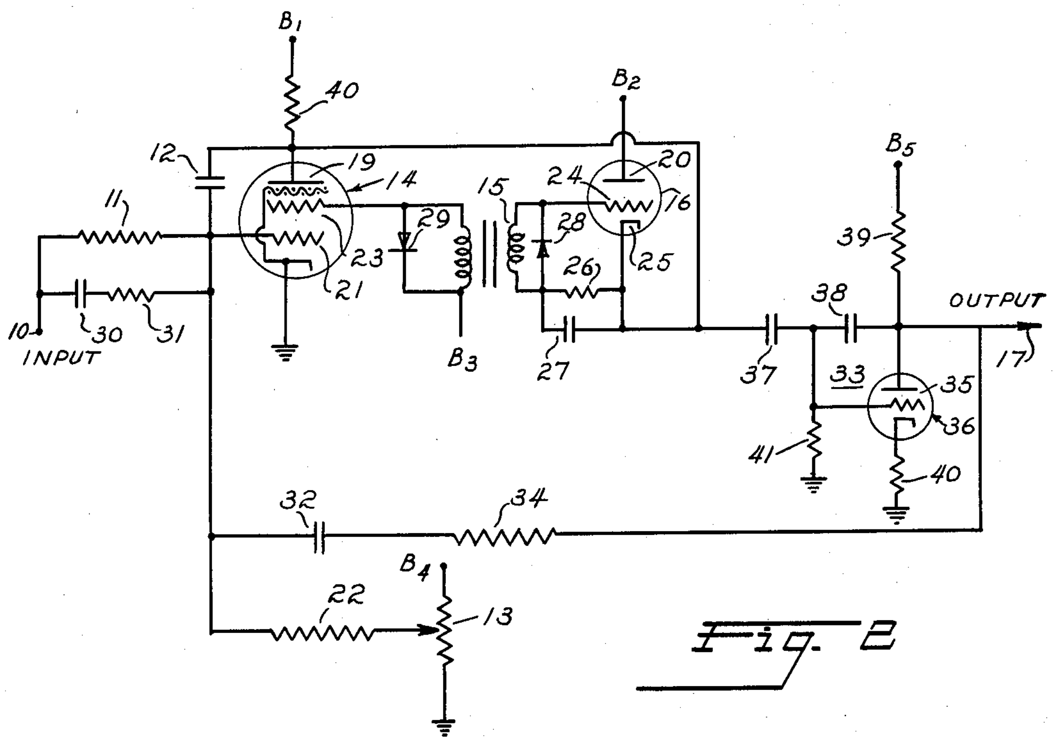
Figure 1:
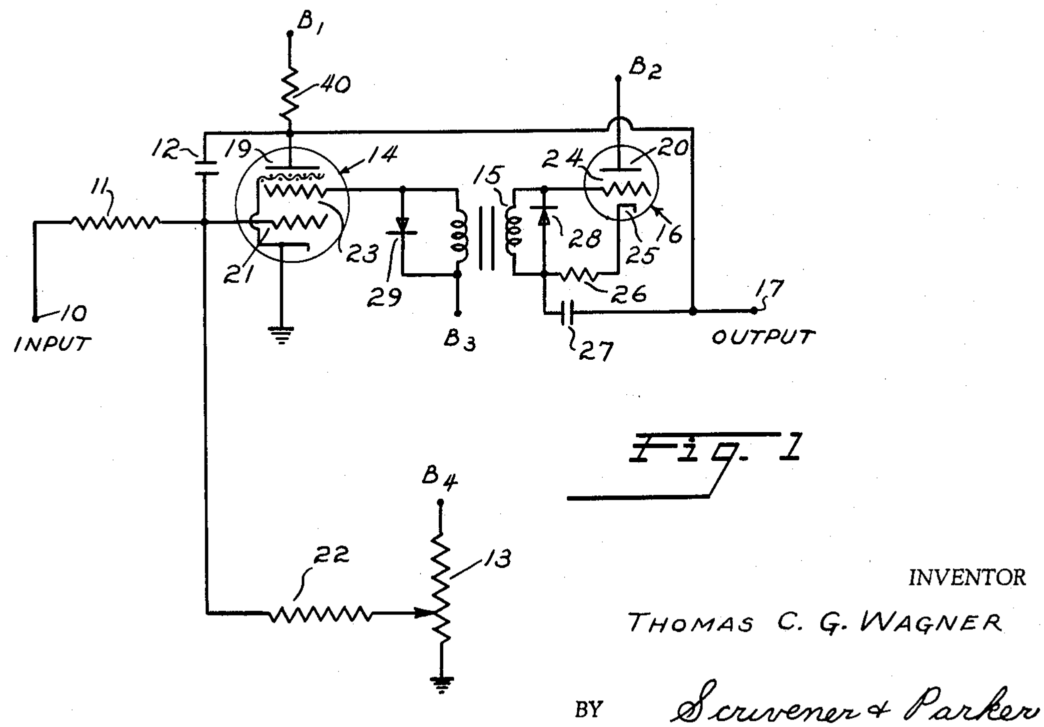

Other objects and their attendant advantages will become apparent when the following description is read in conjunction with the accompanying drawings wherein;

Fig. 1 is a diagrammatic representation of a circuit comprising one embodiment of the present invention, and Fig. 2 is a view similar to Fig. 1 representing a second embodiment of the present invention.

With reference to the drawings and particularly Fig. 1 thereof, a circuit is illustrated having a cycle of operation comprising a trace and a retrace portion. The elements of the circuit comprise a source 10, an input resistor 11, a capacitor 12, a potentiometer 13, a pentode 14, a transformer 15, a triode 16 and an output 17. Other pertinent elements such as rectifiers, resistors, and capacitors are provided and will be more fully described hereinafter.

The trace portion of the cycle commences with the plate 19 of pentode 14 at a predetermined voltage and the triode 16 at cut-off pentode tube 14 is thus in an amplifying condition and because of an inverse feed-back through capacitor 12, the grid 21 of tube 14 will remain at a substantially constant negative potential throughout the trace portion of the cycle and the tube will therefore be non-conducting. Thus the sum of the input current through resistor 11 and the current derived from potentiometer 13 flows to capacitor 12, thereby charging it. The charging circuit is substantially constant providing the input voltage and the voltage across resistance 22 in the output circuit of potentiometer 13 are constant. As capacitor 12 is charged, current on plate 19 of tube 14 drops linearly with time until it has almost arrived at ground potential, at which point the gain through the closed loop of grid 21, the screen 23 of tube 14, transformer 15, the grid 24 of tube 16, the cathode 25 of said tube, capacitor 12 and grid 21 of tube 14 equals unity. At percisely this point tube 16 is energized to commence the retrace portion of the cycle. Upon energization of tube 16 to a conducting condition its grid 24 and grid 21 of tube 14 are driven positive resulting in an increase in the current of screen 23 and a very large current through plate 20 of tube 16 to recharge capacitor 12 in an extremely short period of time. When capacitor 12 is again charged to almost the supply voltage of tube 16, the gain of the above described closed loop again becomes unity and tube 16 is suddenly cut off. This marks the end of the cycle and the recommencement of the trace portion thereof.

During the trace portion, the current in grid 24 of tube 16 develops a bias across a resistance 26 and a capacitor 27 so as to retain tube 16 in a cut-off condition throughout the trace period. The retrace time is affected by the choice of tube 16 and transformer 15, the latter having preferably tight coupling and an appropriate magnetizing inductance. Rectifiers 28 and 29 may be provided in the circuit of transformer 15 to prevent ringing thereof. These rectifiers may be diodes or germanium type rectifiers or, depending upon design considerations they may be replaced by resistors or even completely omitted.

In the described circuit of the present invention, the frequency of oscillation is the reciprocal of the sum of the trace time, designated $T_t$ and the retrace time, designated $T_r$. In normal operation the plate and grid wave forms of tube 14 are independent of frequency, resulting in a trace time which is inversely proportional to the charging current of capacitor 12 and this current is linear with respect to time depending upon the input voltage.

Expressing the above relationship in equation form, $$f=\frac{1}{T_t+T_r}$$

where f is the frequency of oscillation.

When the retrace time $T_r$ is substantially less than the trace time $T_t$ the frequency may be approximated as follows:

$$f\approx\frac{1}{T_t}(1-T_r/T_t)$$

By letting x denote the term $1/T_t$ so that X is linearly dependent upon the input voltage, the equation first written becomes:

$$f=\frac{X}{1+T_rX}$$

and denoting the increments of f and X by $\Delta_f$ and $\Delta X$ respectively, upon solving for $\Delta_f$, the first two equations become $$\Delta f=\frac{\Delta X}{(1+T_rX)^2\left(1+\frac{T_r\Delta X}{1+T_rX}\right)}$$

or $$\Delta f\approx\frac{\Delta X}{(1+T_rX)^2}\left[1-\frac{T_r\Delta X}{1+T_rX}\right]$$

It should now be apparent to those skilled in the art that any departure from strict linearity depends upon the magnitude of the retrace time. Obviously, where the retrace time is of extremely short duration relative to the trace time, departure from linearity will be almost insignificant so that large frequency deviations may be obtained with substantially linear transfer characteristics.

With respect to the modulating frequency, the circuit as described above produces substantial linearity of frequency response for a direct-current and for an alternating current whose frequency may vary from a low frequency up to one-half the carrier frequency. In some applications, it is desirable to alter the modulator characteristics so as to provide a pre-emphasis of the higher frequencies. Since modulator sensitivity depends directly on the admittance connecting the grid 21 of tube 14 to the input 10, additional elements to increase this sensitivity may be incorporated into the circuit. With reference to Fig. 2 of the drawing, in which elements identical to those in Fig. 1 have the same reference characters, a capacitor 30 and a resistor 31 may be added to increase the admittance between grid 21 and input 10 thereby increasing the sensitivity of the modulator at the higher frequencies. However, as a result of this addition, the plate waveform of tube 14 exhibits curvature. Although this curvature does not affect the linearity of the modulation characteristics, it does reduce the frequency stability of the oscillator which may be corrected by the introduction of positive feed-back to tube 14.

One means for producing a positive feedback is illustrated in Fig. 2 and comprises generally a blocking capacitor 32 and a phase inversion circuit 33 with a resistor 34 connected between one end of capacitor 32 and the plate 35 of phase inverter triode tube 36. Since the output of tube 36 is of the opposite phase as the plate 19 of tube 14 it will be apparent that the feedback thereto will be positive, resulting in the desired stabilization of oscillator frequency. Other elements provided in the described stabilizing circuit are capacitors 37 and 38 for controlling the gain of tube 36, and resistors 39, 40 and 41 which are respectively the normal plate, cathode, and grid resistors for tube 36.

As illustrated in each of the embodiments of the present invention a resistor 40 may be provided in the plate circuit of pentode tube 14 to improve the operating point thereof. The potentiometer 13 is provided in both modifications of the circuits of the present invention for setting the frequency of oscillation when the input 10 is at ground potential.

It should now be apparent that the present invention provides a frequency modulated oscillator having linear transfer characteristics with an extremely short recovering time thereby rendering it capable of high frequency operation for circuits of general application. Inasmuch as the capacitor 12 is linearly charged between well established voltages to determine the frequency, the oscillator of the present invention has greater stability than obtained heretofore by the use of multivibrators and similar devices.

What is claimed is:

1. A frequency modulated oscillator comprising a first tube of the type including a plate, a suppressor grid, a screen grid, a control grid and a cathode, a capacitor having one side connected to the control grid of said tube and the other side connected to the plate thereof, an input terminal connected through an impedance to said control grid and said capacitor, a second tube of the type having a plate, a grid and a cathode, having the cathode connected to the plate of said first tube, a transformer connected between the screen grid of said first tube and the grid of said second tube, means for retaining said second tube biased below cut-off during discharge of said capacitor and means for suddenly rendering said second tube conducting upon completion of said discharge to recharge rapidly said capacitor.

2. A frequency modulated oscillator comprising a first tube of the type including a plate, a suppressor grid, a screen grid, a control grid and a cathode, a capacitor having one side connected to the control grid of said tube and the other side connected to the plate thereof, an input terminal connected through an impedance to said control grid and said capacitor, a second tube of the type having a plate, a grid and a cathode, having the cathode connected to the plate of said first tube, a transformer having its primary connected to the screen grid of the first tube and its secondary connected to the grid of said second tube, and R. C. impedance connected between the input and the control grid of said first tube to increase the sensitivity of the modulator circuit for high frequencies and means for impressing positive feedback on said control grid.

3. The frequency modulated oscillator as recited in claim 2 wherein said last named means comprises a feedback circuit in parallel with the grid circuit, a blocking capacitor and a resistance in series in said circuit, and a phase inverting circuit having an output connected to the feedback circuit, said output having a polarity opposite in phase to the plate of said first tube.

4. The frequency modulated oscillator as recited in claim 2 wherein a potentiometer is provided in parallel with the input to set the frequency of oscillation when said input is at ground potential.

No references cited.